US006453605B1

(12) United States Patent
Chien

(10) Patent No.: US 6,453,605 B1

(45) Date of Patent: Sep. 24, 2002

(54) METHOD OF FABRICATING A FLOWER SLEEVE AND THE STRUCTURE THEREOF

(76) Inventor: Mickey Chien, No. 97, Lane 63, Gueiren Rd., Pingtung City (TW)

(*) Notice: Subject to any disclaimer, the term of this patent is extended or adjusted under 35 U.S.C. 154(b) by 0 days.

(21) Appl. No.: 09/976,360

(22) Filed: Oct. 11, 2001

(51) Int. Cl.[7] .................................................. A01G 5/00

(52) U.S. Cl. ........................................ 47/41.01; 53/399

(58) Field of Search ............................ 47/41.01; 42/72; 53/399; 206/554

(56) References Cited

U.S. PATENT DOCUMENTS

| | | | | | |
|---|---|---|---|---|---|
| 3,008,569 | A | * | 11/1961 | Murch | 206/554 |
| 4,046,257 | A | * | 9/1977 | Lehmacher | 206/544 |
| 4,557,384 | A | * | 12/1985 | Membrino | 206/494 |
| 5,590,784 | A | * | 1/1997 | Daniels | 206/554 |
| 5,817,382 | A | * | 10/1998 | Cheng | 229/87.01 |
| 5,943,819 | A | * | 8/1999 | Weder et al. | 229/87.01 |
| 5,966,869 | A | * | 10/1999 | Weder | 206/423 |
| 5,974,730 | A | * | 11/1999 | Chien | 206/423 |
| 6,098,336 | A | * | 8/2000 | Ferguson | 206/423 |
| 6,142,302 | A | * | 11/2000 | Requena | 206/554 |
| 6,195,937 | B1 | * | 3/2001 | Weder | 47/72 |
| 6,385,904 | B1 | * | 5/2002 | Weder | 47/72 |

* cited by examiner

*Primary Examiner*—Charles T. Jordan
*Assistant Examiner*—Jordan M Lofdahl
(74) *Attorney, Agent, or Firm*—David A. Belasco; Belasco Jacobs & Townsley, LLP

(57) ABSTRACT

A method for fabricating a flower sleeve includes defining slits in an upper sleeve part and forming a reserved part between the upper sleeve part and an edge, combining the upper sleeve part of non-elongatable material with a lower sleeve part of non-elongatable material, cutting the combined upper and lower sleeve parts and simultaneously engaging lateral edges of the upper sleeve part and the lower sleeve part by heat fusion; and cutting both the upper and lower sleeve parts to form a wave-like cut that corresponds to the slits in the upper sleeve part to separate the upper sleeve part from the reserved part yet maintain engagement of the lower sleeve part with the reserved part.

3 Claims, 2 Drawing Sheets

METHOD OF FABRICATING A FLOWER SLEEVE AND THE STRUCTURE THEREOF

BACKGROUND OF THE INVENTION

1. Field of the Invention

The present invention relates to a method for fabricating a flower sleeve and the structure of the flower sleeve made by the method, and more particularly to a method for fabricating a flower sleeve including a reserved portion, an upper sleeve plate detached from the reserved portion and having two opposite lateral edges and a lower sleeve plate engaged with the reserved portion and laterally connected to the two opposite lateral edges of the upper sleeve plate so that the user can easily open the flower sleeve while detaching the flower sleeve from the reserved portion.

2. Description of Related Art

Florist shops use flower sleeves to package a bunch of flowers. In the conventional method of packaging a bunch of flowers, the florist wraps a transparent plastic sheet around the bunch of flower. This kind of transparent plastic sheet is not only expensive, but also requires a lot of time for the florist to properly wrap the flowers.

To obviate the drawback, U.S. Pat. No. 5,228,234 discloses an improved flower sleeve or a bag-like container. The flower sleeve includes a first lower container part and a second container part connected at two lateral edges of the first lower container part and the second upper container parts. The first and second container parts are made of non-elongatable material such that the lateral edges are apt to tear. In addition, the wide, open edge of the first container part must protrude beyond the wide open edge of the second container part, and thus is time-consuming to manufacture.

U.S. Pat. No. 5,974,730 discloses a flower sleeve with a sheet-like upper sleeve part and a sheet-like lower sleeve part. The upper sleeve part is made of non-elongatable material, and the lower sleeve part is made of elongatable material. The upper sleeve part can be torn at the tear line, and the tear line of the lower sleeve part can be torn after a bunch of flower is packaged. Although the ’730 patent does obviate the problems the ’234 patent has, the ’730 patent still has its shortcomings. When the flower sleeve of the ’730 patent is in use, both the upper and lower sleeve parts are still connected to the upper edge of the flower sleeve. Consequently, the user still has to use both hands to open the flower sleeve to put the flowers in the flower sleeve.

To overcome the shortcomings, the present invention tends to provide an improved method and structure of a flower sleeve to mitigate and obviate the aforementioned problems.

SUMMARY OF THE INVENTION

The primary objective of the present invention is to provide a method for fabricating a flower sleeve that is easily opened to insert a bunch of flowers. The method comprises defining slits in an upper sleeve part and defining a cut in both the upper sleeve part and a lower sleeve part connected to the upper sleeve part at lateral edges of the lower sleeve and the upper sleeve part so that the upper sleeve part is detached from a reserved part and the lower sleeve part is detachably connected to the reserved part.

Another objective of the present invention is to provide a flower sleeve structure that is easily opened to insert a bunch of flowers. Both the upper and lower sleeve parts of the flower sleeve have a cut corresponding to each other. In addition, the upper sleeve part has multiple slits corresponding to the cut so that the upper sleeve part is detached from the reserved part and the lower sleeve part is detachably connected to the reserved part.

Other objects, advantages and novel features of the invention will become more apparent from the following detailed description when taken in conjunction with the accompanying drawings.

DETAILED DESCRIPTION OF THE PREFERRED EMBODIMENT

Figure 1:
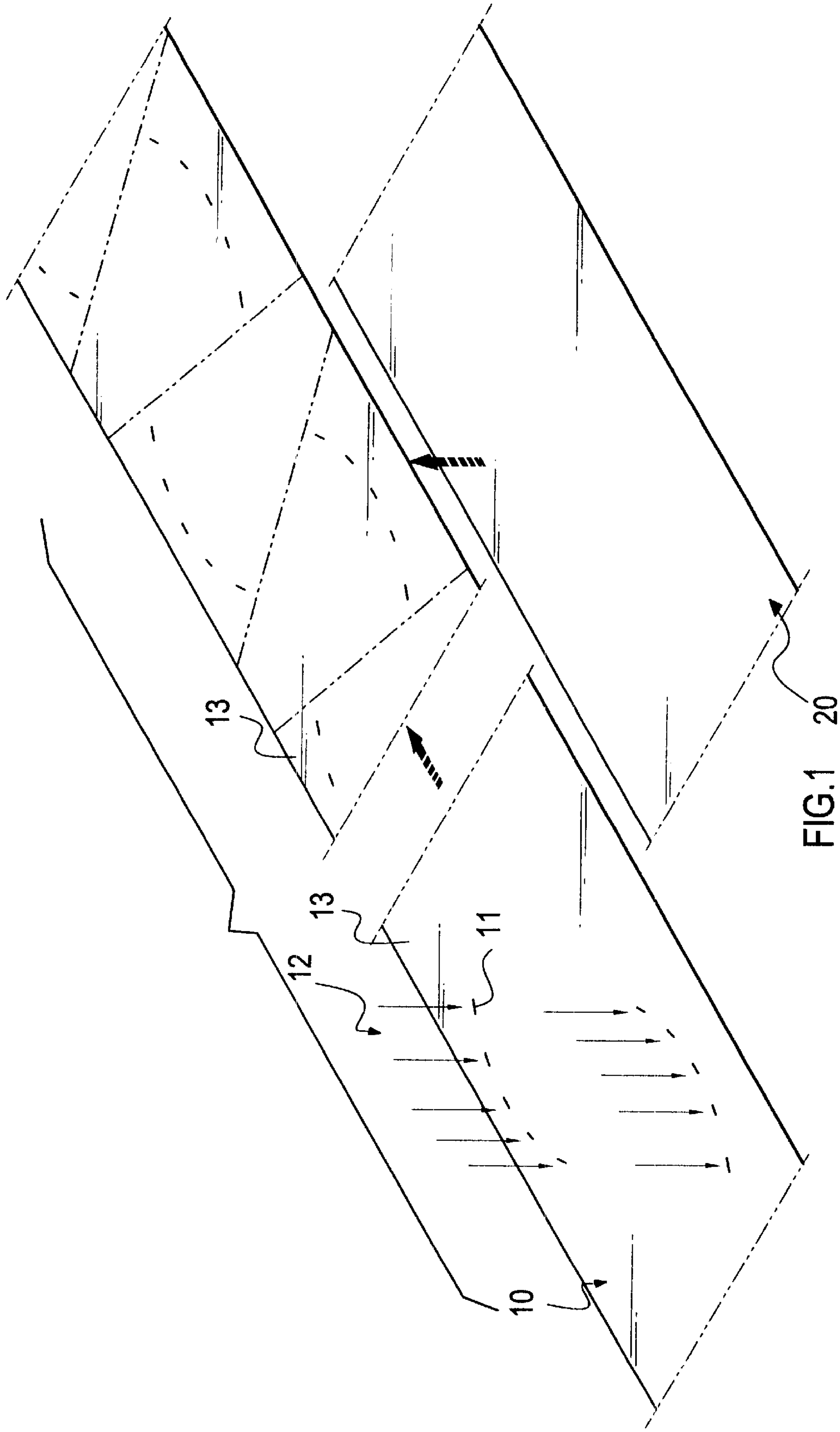
FIG. 1 is a perspective view of the flower sleeve in accordance with the present invention at the various stages of the method to fabricate the flower sleeve in accordance with the present invention.

With reference to FIG. 1, a non-elongatable material, transparent upper sleeve part (10) and a non-elongatable material, transparent lower sleeve part (20) are separately fed to and then combined by a conveyer assembly (not shown). Before the upper and lower sleeve parts (10, 20) are combined, multiple slits (11) are defined on the upper sleeve part (10) by a first blade module (12) A reserved part (13) is formed between the slits (11) and a “top” edge. In order to increase the fabrication speed and save material, the slits (11) are alternately defined near opposite sides of the upper sleeve part (10).

Figure 2:
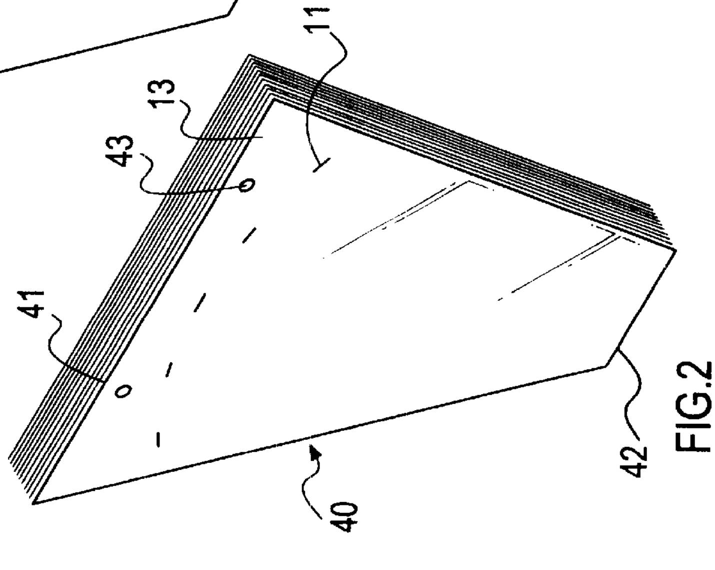
FIG. 2 is a perspective view of a stack of flower sleeve semi-products made in accordance with the method to fabricate flower sleeves in accordance with the present invention.

With reference to FIG. 2, after the upper and lower sleeve parts (10, 20) are combined, the combined upper and lower sleeve parts (10,20) are cut to form a basic flower sleeve. During the cutting process, a heat fusion process simultaneously engages lateral edges of both the upper sleeve part (10) and the lower sleeve part (20).

After the heat fusion process, each of the basic flower sleeves (40) stacked together has a large opening (41) and a small opening (42) defined on an edge opposite from the large opening (41). A step of punching holes (43) in the reserved part (13) is carried out to hang the stack of flower sleeves (40) on an object for later use.

Figure 4:
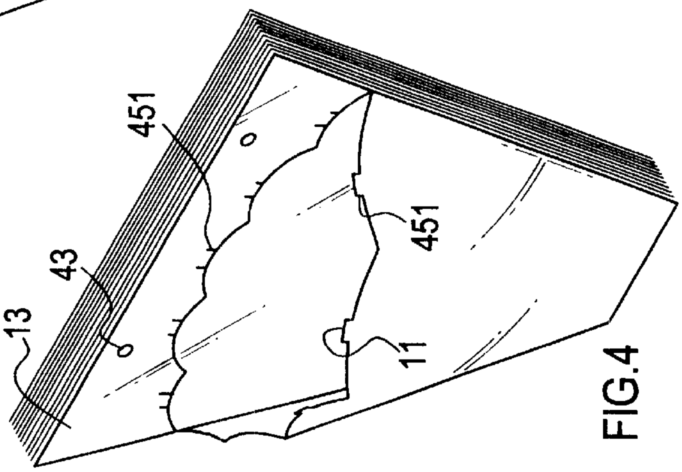
FIG. 4 is a perspective view of a stack of the flower sleeves in FIG. 3 with the upper sleeve part detached from the reserved part.
Figure 3:
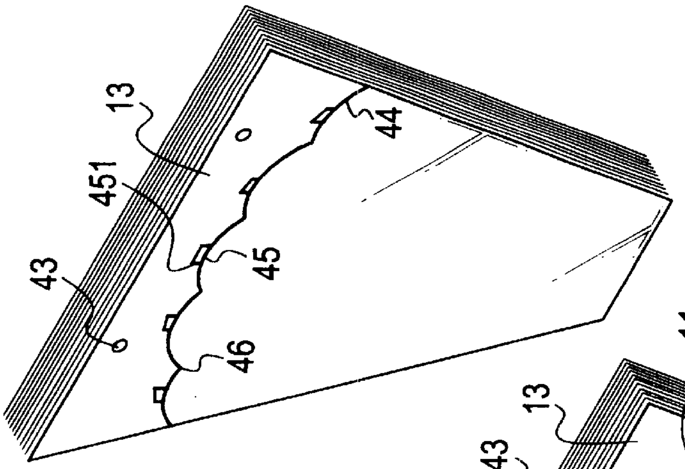
FIG. 3 is a perspective view of a stack of the flower sleeves made in accordance with the method to fabricate flower sleeves in accordance with the present invention.

With reference to FIGS. 3 and 4, a second blade module (not shown) with a wave-like cut is employed to cut the stacked basic flower sleeves (40). The wave-like cut (44) formed on the stacked basic flower sleeves (40) has peaks (45) and troughs (46). Each peak (45) has two parallel secondary slits (451) defined in the peak (45) and corresponding to each of the slits (11) in the upper sleeve part (10). That is, each slit (11) in the upper sleeve part (10) communicates with the two parallel secondary slits (451). Therefore, after the cut to the stacked basic flower sleeve (40), the upper sleeve part (10) is detached from the reserved part (13) and the lower sleeve part (20) is still connected to the reserved part (13).

Figure 5:
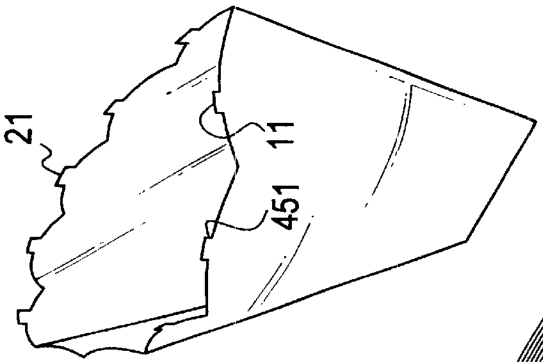
FIG. 5 is a perspective view of the flower sleeve in accordance with the present invention, wherein the lower sleeve part has multiple bosses protruding outward to be detachably connected to the reserved part.

With reference to FIG. 5, the flower sleeve has an upper sleeve part (10), a lower sleeve part (20) and a reserved part (13). The lower sleeve part (20) is attached to the tipper sleeve part (10) at the lateral edges. The reserved part (13) is detached from the wave-like cut (44) on the upper sleeve part (10) yet connected to the lower sleeve part (20) by bosses (21) formed on the wave-like cut (44) on the lower sleeve part (20).

Since the upper sleeve part (10) of the flower sleeve is detached from the reserved part (13) and the lower sleeve part (20) is connected to the reserved part (13) by the bosses (21), the user can easily separate the upper sleeve part (10) from the lower sleeve part (20) and pack the flower bunch.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for fabricating a flower sleeve comprising the acts of:

defining slits in an upper sleeve part and forming a reserved part between the upper sleeve part and a top edge;

combining the upper sleeve part of non-elongatable material with a lower sleeve part of non-elongatable material;

cutting the combined upper and lower sleeve parts and simultaneously engaging lateral edges of the upper sleeve part and the lower sleeve part by heat fusion; and cutting both the upper and lower sleeve parts to form a wave-like cut that corresponds to the slits in the upper sleeve part to separate the upper sleeve part from the reserved part yet maintain engagement of the lower sleeve part with the reserved part.

2. A flower sleeve comprising:

an upper sleeve part of non-elongatable material with lateral edges, slits defined in the upper sleeve part and a cut in the upper sleeve part and having multiple pairs of parallel secondary slits each communicating with each other by means of a corresponding one of the slits, wherein the cut forms a reserved part that is separate from a top edge of the upper sleeve part;

a lower sleeve part of non-elongatable material with lateral edges engaged with the lateral edges of the upper sleeve part, a cut in the lower sleeve part to form a reserved part in the lower sleeve part and having multiple pairs of parallel secondary slits extending outward from peaks of the cut to engage with the reserved part of the lower sleeve part;

whereby the upper sleeve part is separate from the reserved part at the cut of the upper sleeve part and the lower sleeve part is connected to the reserved part by means of bosses formed on the peaks of the cut of the lower sleeve part such that the flower sleeve is easily opened.

3. The flower sleeve as claimed in claim 2, wherein the cut is wave-like.

* * * * *